United States Patent [19]
Naylor

[11] 3,802,393
[45] Apr. 9, 1974

[54] ANIMAL STALL DOOR

[76] Inventor: Donald B. Naylor, 1013 N. Michigan St., Plymouth, Ind. 46563

[22] Filed: Mar. 14, 1973

[21] Appl. No.: 341,180

[52] U.S. Cl. ................................ 119/27, 49/409
[51] Int. Cl. ............................................ A01k 01/00
[58] Field of Search .................. 119/27, 16; 49/409

[56] References Cited
UNITED STATES PATENTS

| 721,578 | 2/1903 | Locke | 119/27 |
| 3,550,559 | 12/1970 | Long et al. | 119/20 |
| 3,693,592 | 9/1972 | Little | 119/27 |

Primary Examiner—Hugh R. Chamblee
Attorney, Agent, or Firm—Oltsch & Knoblock

[57] ABSTRACT

A door for use with an animal stall having an opening therein spanned by the door. Such door includes upper and lower solid panels having a grill work therebetween and being secured together by vertically oriented U-shaped channel members.

7 Claims, 9 Drawing Figures

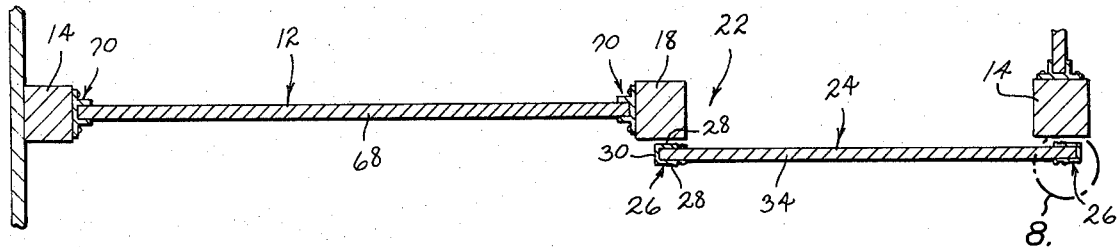
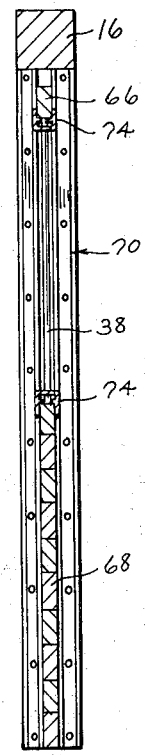
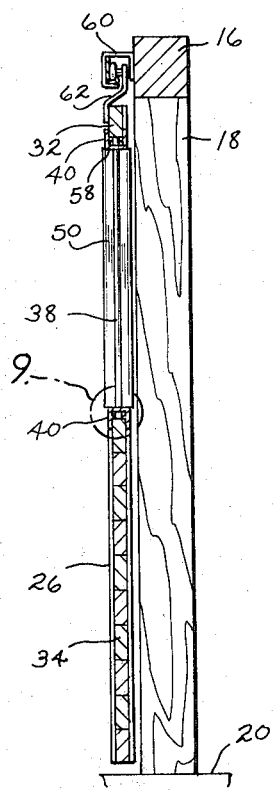
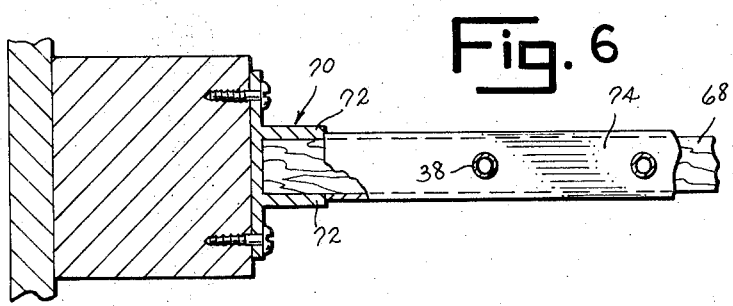

3,802,393

ANIMAL STALL DOOR

SUMMARY OF THE INVENTION

This invention relates to a door which is used to close the opening into an animal stall.

The door of this invention can be used in stalls for horses, cattle, and similar livestock and farm animals and includes upper and lower panels which are spaced apart and which carry grill work therebetween. The panels and grill work are secured together by vertically oriented U-shaped channel members into which the side edges of the upper and lower panels are inserted and secured. The lower panel of the door preferably constitutes a plurality of horizontal boards placed edge upon edge.

It is an object of this invention to provide a door for an animal stall which is of simplified and economical construction.

Another object of this invention is to provide a door for an animal stall which includes grill means and which is of sturdy construction.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 3 is a sectional view taken along line 3—3 of FIG. 2.

FIG. 4 is a sectional view taken along line 4—4 of FIG. 2.

FIG. 5 is a sectional view taken along line 5—5 of FIG. 2.

FIG. 6 is a fragmentary detailed sectional view taken along line 6—6 of FIG. 2.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
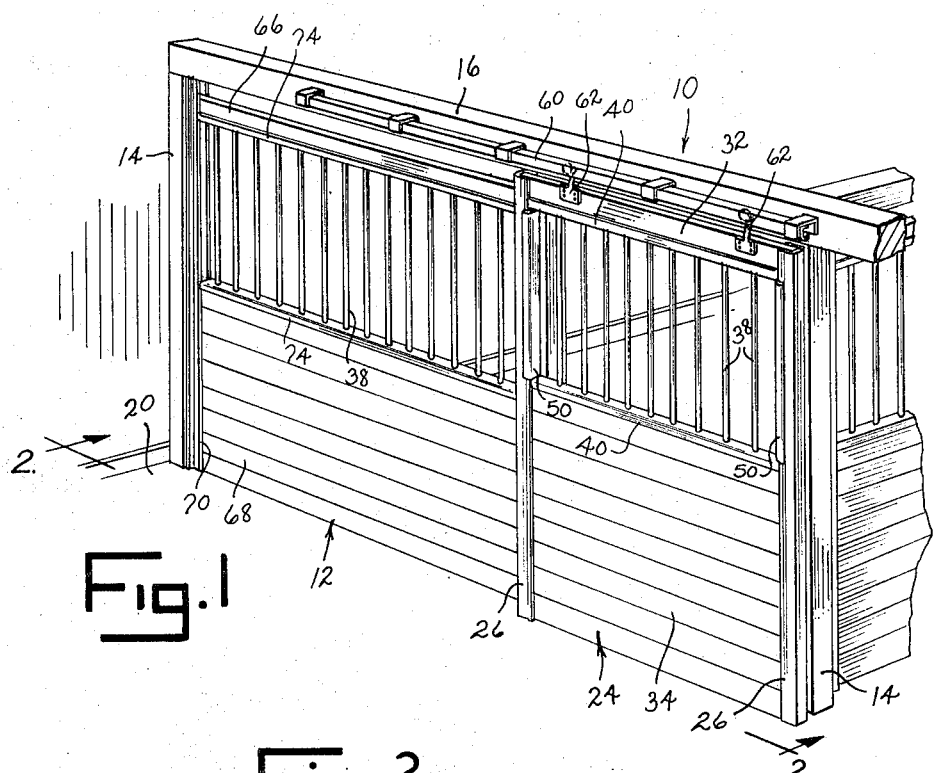
FIG. 1 is a perspective view of the animal stall having the door of this invention spanning the opening thereof.
Figure 2:
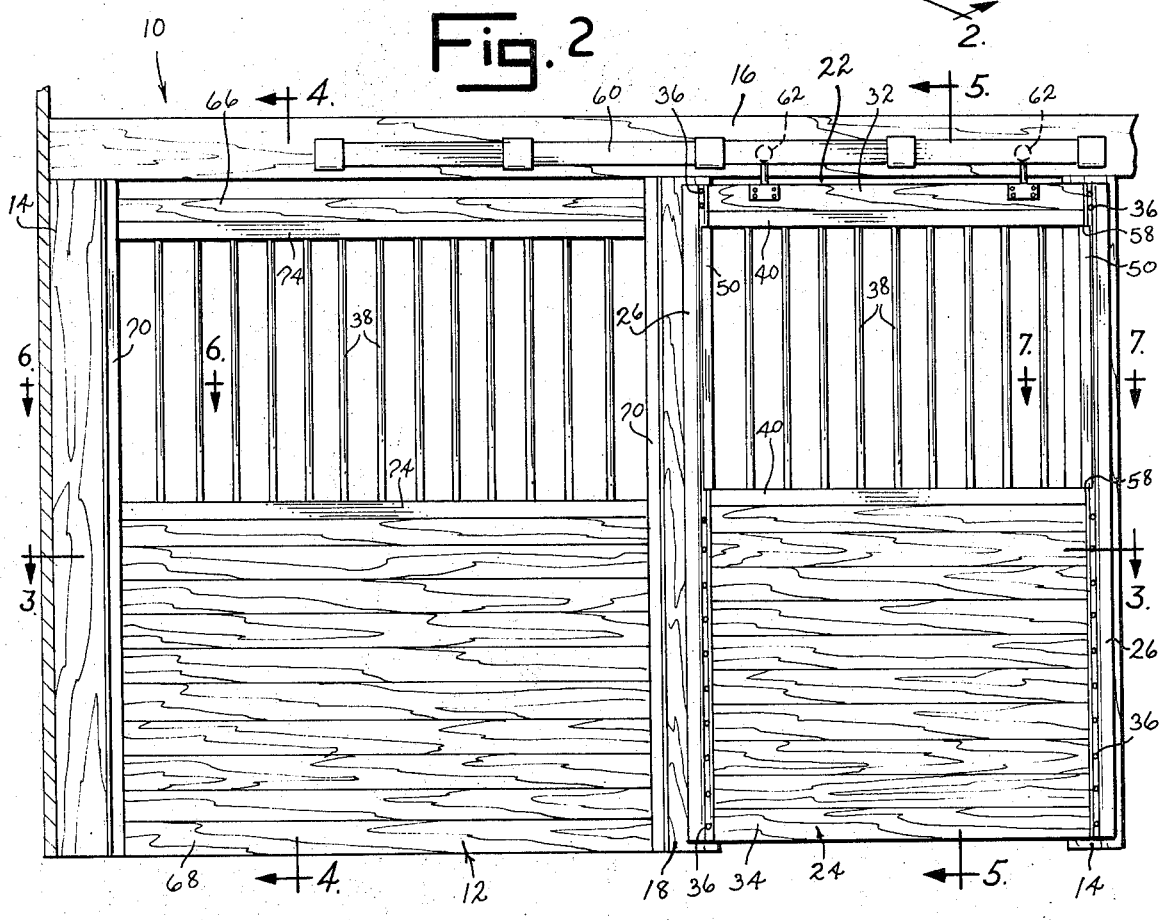
FIG. 2 is a front view of the animal stall as seen along line 2—2 of FIG. 1.

Referring to FIGS. 1 and 2, animal stall 10 includes a front wall 12 defined by vertical end posts 14 and an overhead horizontal cross member 16. An intermediate stanchion or post 18 extends between cross member 16 and floor 20 of the stall and defines in conjunction with one of the end posts 14 an opening 22 into the stall. The door 24 of this invention spans stall opening 22.

Door 24 includes a pair of vertical U-shaped channel members 26. Each channel member 26 includes spaced sides 28 interconnected by a web 30. Extending between channel members 26 is an upper panel 32 and a lower panel 34. Upper panel 32 is preferably a wooden board which has its end edges inserted into the openings of channel members 26 between sides 28 thereof and which is secured at the upper end of the channel members by means of screws 36 inserted through sides 28 of the channel members and turned into the panel. Lower panel 34 preferably constitutes a plurality of boards disposed horizontally in an edge upon edge relationship with the corresponding ends thereof extending into the openings in channel members 26 between sides 28. Screws 36 are inserted through the channel members and turned into the lower panel boards to secure the boards to the channel members.

Figure 9:
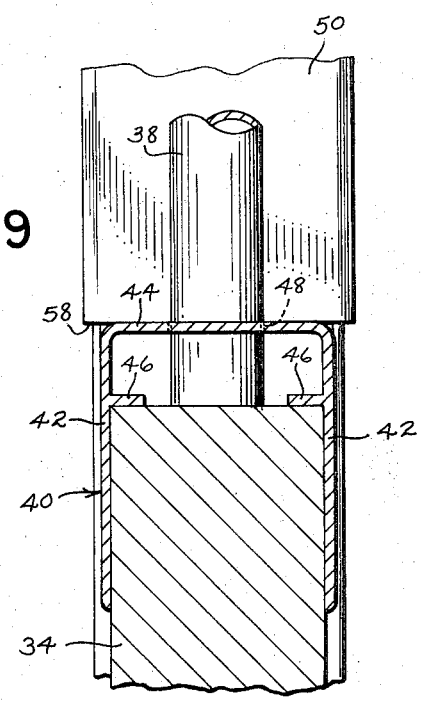
FIG. 9 is a detailed view taken of that portion of FIG. 5 within broken line circle 9.

Upper panel 32 and lower panel 34 are spaced apart to accommodate vertical bars 38 which constitute a grill means in door 24. Bars 38 are retained in position by a pair of horizontal U-shaped channel members 40. Each horizontal channel member 40 includes sides 42 which are interconnected by a web 44. One channel member 40 is fitted over the lower edge of upper panel 32 and the other channel member 40 is fitted over the upper edge of lower panel 34 with web 44 of each channel member being spaced from its receiving panel, as shown in FIG. 9 for the lower panel, by means of oppositely spaced internal flanges 46 carried by sides 42 of each channel member. The webs 44 of channel members 40 have oppositely aligned openings 48 formed therein. The end portions of bars 38 extend through openings 48 in each of the channel members 40 with each bar preferably resting upon the upper edge of lower panel 34. It is to be noted that the construction of the channel member 40 which fits over the lower edge of upper panel 34 is the same as the channel member 40 which is fitted over the upper edge of lower panel 32 as shown in FIG. 9 with bars 38 being accommodated by both channel members in the same fashion.

Figure 7:
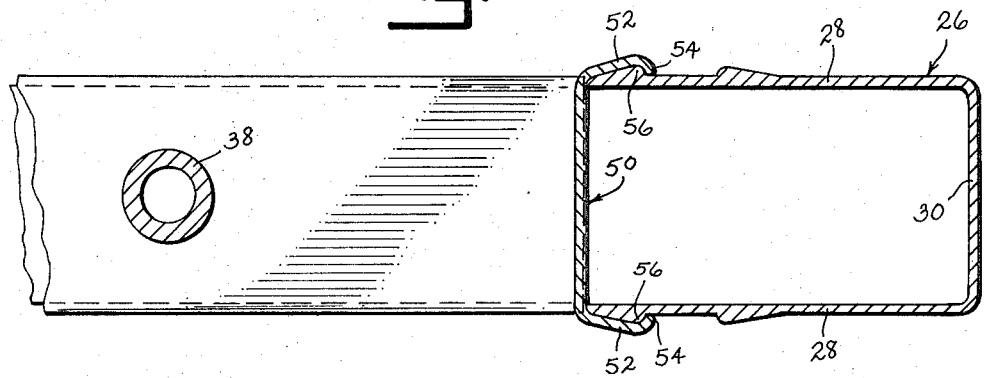
FIG. 7 is a fragmentary detailed sectional view taken along line 7—7 of FIG. 2.
Figure 8:
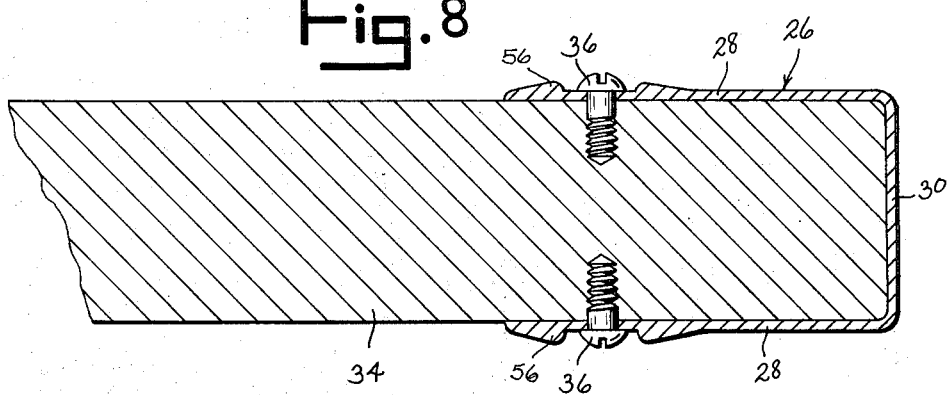
FIG. 8 is a detailed view taken of that portion of FIG. 3 within broken line circle 8.

A C-shaped cap 50 extends between horizontal channel members 40 at each side of the door 24. Each cap 50 includes side flanges 52 which terminate in spaced opposed inturned margins 54, best seen in FIG. 7. Each cap 50 is secured to a vertical channel member 26 through a snap-fit arrangement in which flanges 52 are flexibly fitted over beveled protrusions 56 formed on the outer surface of each side 28 of the channel member. Inturned margins 54 of each cap 50 fit behind protrusions 56 and serve to secure the cap to the vertical channel member. The beveled arrangement of protrusions 56 permit cap 50 to be pressed onto a vertical channel member over the opening therein with cap flanges 52 being flexed outwardly and around the protrusions. The end edges 58 of caps 50 preferably fit between and abut horizontal channel members 40, thus serving to prevent the channel member 40 which is fitted around upper panel 32 from slipping downwardly.

Door 24 as above described can be quickly and easily assembled through the use of simple hand tools. Vertical channel members 36, horizontal channel members 40, bars 38 and caps 50 are all preferably of respective uniform cross section and can be economically formed by extrusion. Additionally, by constructing the channel members, bars and caps of aluminum, magnesium, or a similar metal, the door can be light-weight but of extremely sturdy construction.

While door 24 can be hinged, it is preferable to hang it as a sliding door. This can be accomplished by several methods well known in the art, such as the inclusion of a guide rail 60 secured along cross member 16 at the front of stall 10. Suitable roller supports 62 are secured to upper panel 32 of the door and slidably fitted within rail 60.

That portion of front wall 12 extending between the distant corner post 14 and intermediate post 18 can also include an upper panel 66 and a lower multiple-board panel 68 which are secured between posts 14 and 18 by means of elongated brackets 70. Brackets 70 extend from floor 20 to cross member 16 and are designed with spaced flanges 72 between which the end edges of panels 66 and 68 are fitted, as best shown in FIG. 6. Horizontal channel members 74, of similar cross section as channel members 40, extend between brackets 70 and fit around the lower edge of upper panel 66 and the upper edge of lower panel 68. Bars 38 extend between panels 66 and 68 and through aligned openings in channel members 74.

The above invention is not to be limited to the details above described but may be modified within the scope of the appended claims.

What I claim is:

1. A door for use with an animal stall, said stall having an opening, said door spanning said opening and comprising a pair of cross-sectionally U-shaped vertically oriented spaced channel members having upper and lower ends, each vertical channel member having spaced sides and interconnecting web cooperating to define an opening into the channel member between said sides and opposite said web, said vertical channel members having the opening therein opposed to one another, a lower panel located between said vertical channel members and extending upwardly from the lower ends of the channel members and terminating in an upper edge spaced below the upper ends of the channel members, said lower panel including end edges fitting into the openings in said vertical channel members and between the sides thereof, an upper panel located between said vertical channel members and extending downwardly from the upper ends of said channel members and terminating in a lower edge spaced above the upper edge of said lower panel, said upper panel including end edges fitting into the openings in said vertical channel members and between the sides thereof, a pair of cross-sectionally U-shaped horizontally oriented channel members, each horizontal channel member having spaced sides and an interconnecting web cooperating to define an opening into said horizontal channel member, one horizontal channel member overlying the upper edge of said lower panel and extending between vertical channel members with said lower panel upper edge fitting into the opening into said one horizontal channel member, the other horizontal channel member overlying the lower edge of said upper panel and extending between said vertical channel members with said upper panel lower edge fitting into the opening into said other horizontal channel member, elongated caps extending between horizontal channel members, one cap fitting over the opening in one vertical channel member between said horizontal channel members, the other cap fitting over the opening in the other vertical channel member between said horizontal channel members, means securing said caps to said vertical channel members, means securing said upper and lower panels to said vertical channel members, and grill means extending between said upper and lower panels and retained by said horizontal channel members.

2. The door of claim 1 wherein said cap and vertical channel member securement means constitute cooperating clip parts, one clip part carried by each cap and the other clip part carried by each vertical channel member to provide a snap-fit of each cap upon a vertical channel member.

3. The door of claim 2 wherein each cap is of a general C-shaped cross sectional configuration having side flanges terminating in spaced opposed inturned margins, each vertical channel member having protrusions formed along the outer faces of its sides adjacent the opening therein, the inturned margins of each cap fitting behind said protrusions.

4. The door of claim 3 wherein said upper and lower panel and vertical channel member securement means constitute elongated attachment means inserted through said vertical channel members and into said panels.

5. The door of claim 1 wherein said lower panel is a plurality of horizontally oriented boards laid edge upon edge.

6. The door of claim 1 wherein said grill means includes vertical bars, said bars being laterally spaced between said caps, said horizontal channel members having openings formed in the webs thereof, said bars having upper and lower end portions, said bar end portions inserted into said openings in said horizontal channel member webs.

7. The door of claim 6 wherein the web of said one horizontal channel member is spaced from the upper edge of said lower panel and the web of said other horizontal channel member is spaced from the lower edge of the upper panel, said openings in the webs of the horizontal channel members being aligned, said bars extending through said horizontal channel member web openings and having the lower end portions thereof abutting the upper edge of said lower panel.

* * * * *